United States Patent [19]
Kurata et al.

[11] Patent Number: 5,574,595
[45] Date of Patent: Nov. 12, 1996

[54] OPTICAL ISOLATOR

[75] Inventors: Noboru Kurata, Ikoma; Masaaki Tojo, Nara-ken; Hironori Souda, Osaka, all of Japan

[73] Assignee: Matsushita Electric Industrial Co., Ltd., Osaka, Japan

[21] Appl. No.: 205,431

[22] Filed: Mar. 4, 1994

[30] Foreign Application Priority Data

Mar. 10, 1993 [JP] Japan .................. 5-048837

[51] Int. Cl.$^6$ .................................. G02B 27/28
[52] U.S. Cl. .................. 359/484; 359/487; 359/494; 372/703
[58] Field of Search ....................... 359/633, 484, 359/494, 497, 487, 495, 280, 281, 282, 283, 256; 372/37, 703

[56] References Cited

U.S. PATENT DOCUMENTS

| | | | |
|---|---|---|---|
| 4,548,478 | 10/1985 | Shirasaki | 359/256 |
| 4,893,890 | 1/1990 | Lutes | 359/484 |
| 5,033,830 | 7/1991 | Jameson | 359/494 |
| 5,381,261 | 1/1995 | Hirai et al. | 359/484 |

FOREIGN PATENT DOCUMENTS

| | | | |
|---|---|---|---|
| 61-121027 | 6/1986 | Japan | 359/484 |
| 1169423 | 7/1989 | Japan | 359/484 |
| 477713 | 3/1992 | Japan . | |
| 4221922 | 8/1992 | Japan . | |
| 4331929 | 11/1992 | Japan . | |

*Primary Examiner*—David C. Nelms
*Assistant Examiner*—Vu A. Le
*Attorney, Agent, or Firm*—Lowe, Price, LeBlanc & Becker

[57] ABSTRACT

A polarization independent optical isolator for use in optical communication systems is provided. This optical isolator functions to provide dual-way optical isolation wherein an input optical signal entering in the isolation direction is transmitted through the optical isolator twice using a reflecting member, and includes a magnetooptic plate and a birefringent plate disposed between the magnetooptic plate and the reflecting member. The birefringent plate aligns two linearly polarized optical signals in a transmitting direction, having planes of polarization rotated through a predetermined angle by the magnetooptic plate, on a given optical path with a preselected spatial displacement therebetween for allowing transmission of the optical signals traveling in the transmitting direction, while it orients two linearly polarized optical signals in the isolation direction, having planes of polarization rotated through the predetermined angle by the magnetooptic plate, out of the given optical path for blocking transmission of the optical signals traveling in the isolation direction.

32 Claims, 7 Drawing Sheets

FIG. 1
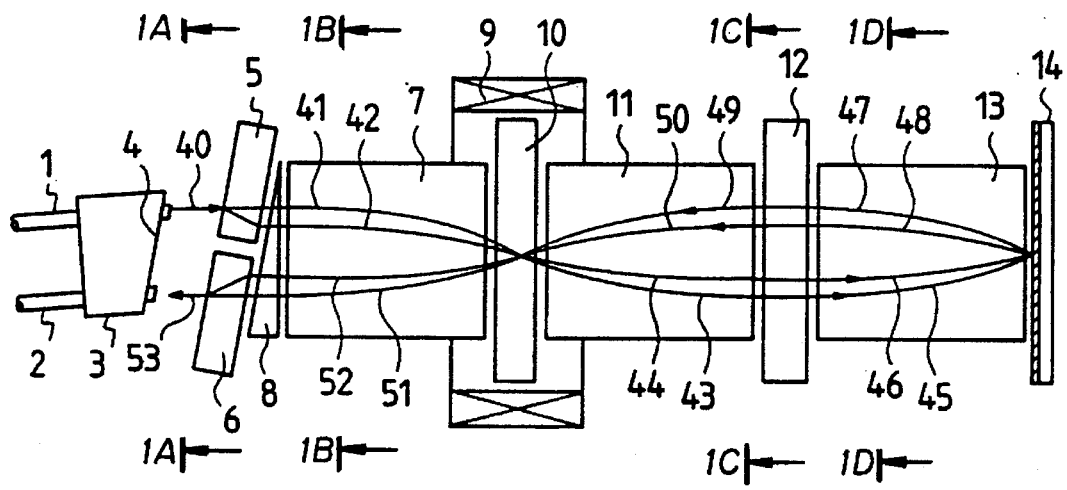
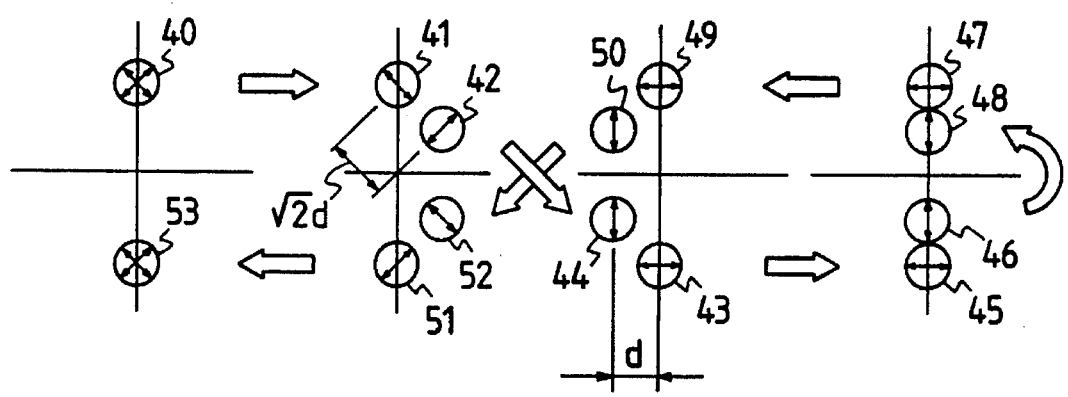
FIG. 1A   FIG. 1B   FIG. 1C   FIG. 1D
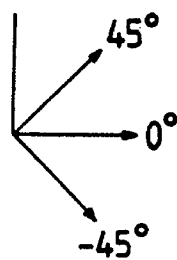
FIG. 1E

FIG. 2
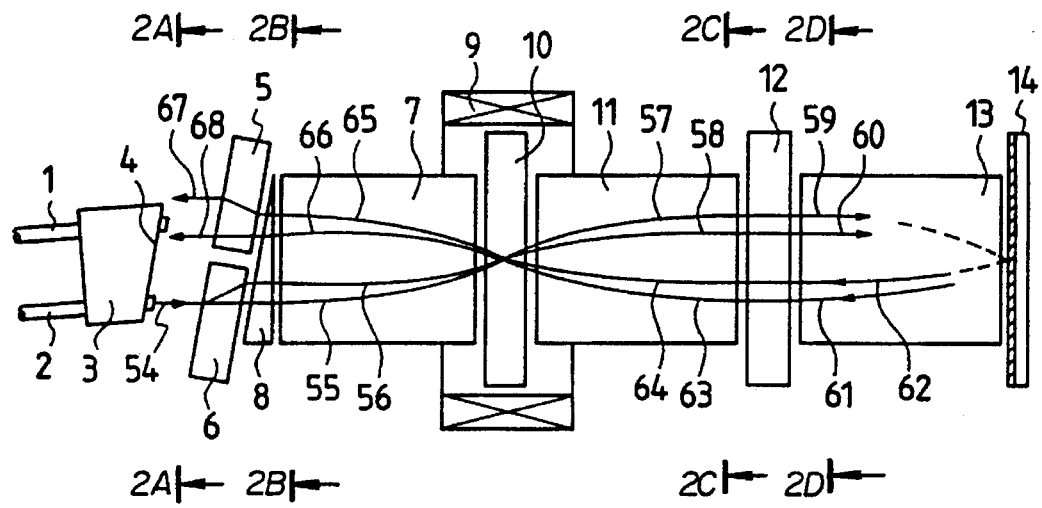
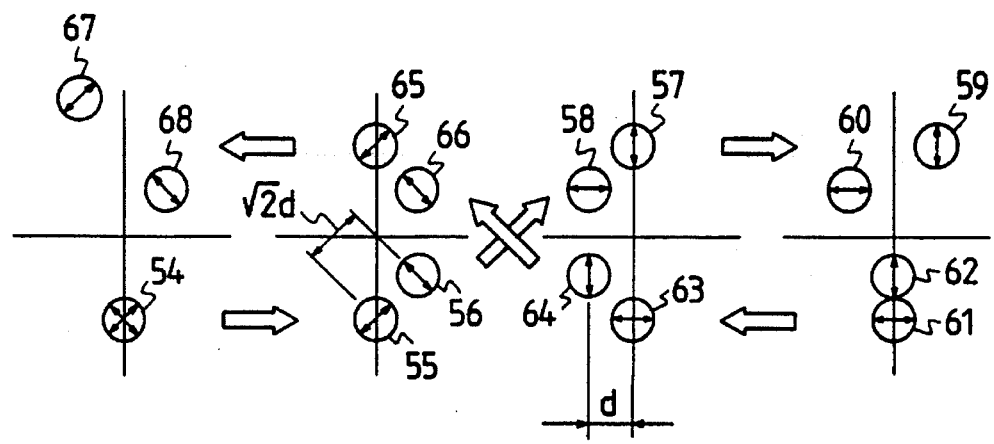
FIG. 2A    FIG. 2B    FIG. 2C    FIG. 2D
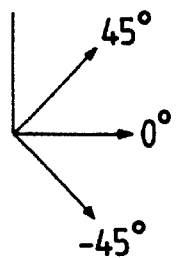
FIG. 2E FIG. 7
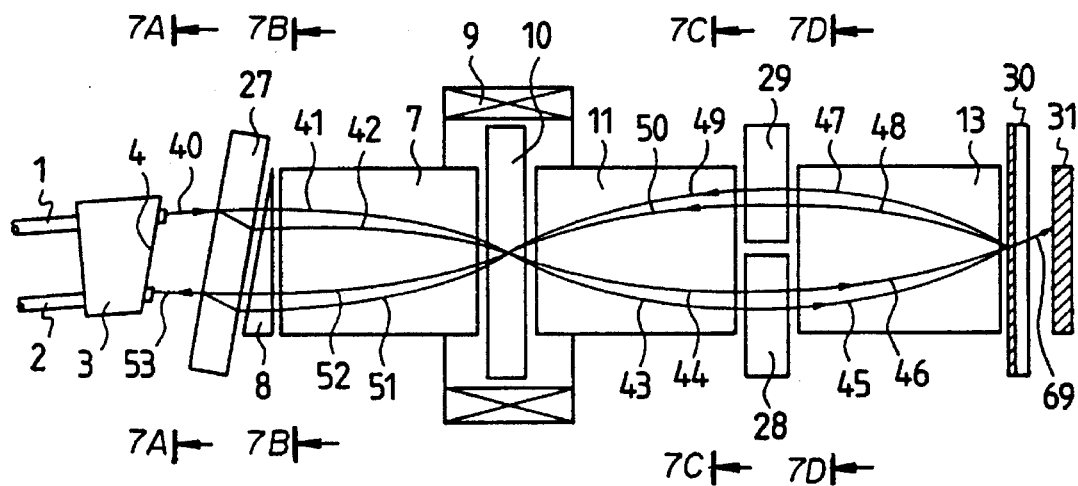
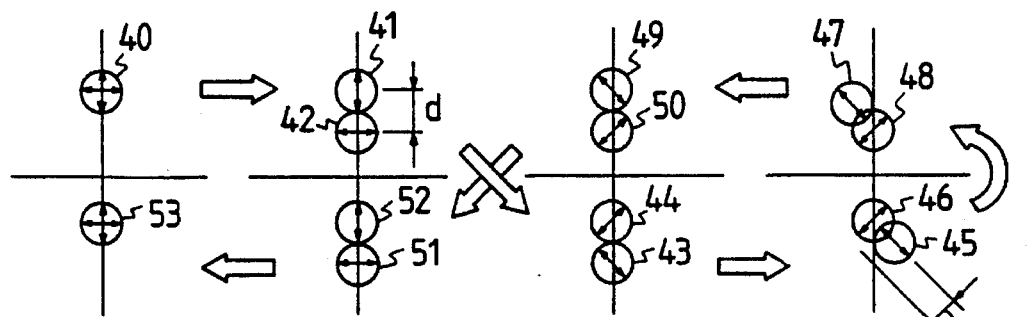
FIG. 7A   FIG. 7B   FIG. 7C   FIG. 7D
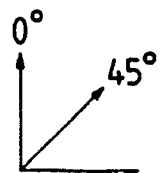
FIG. 7E FIG. 8
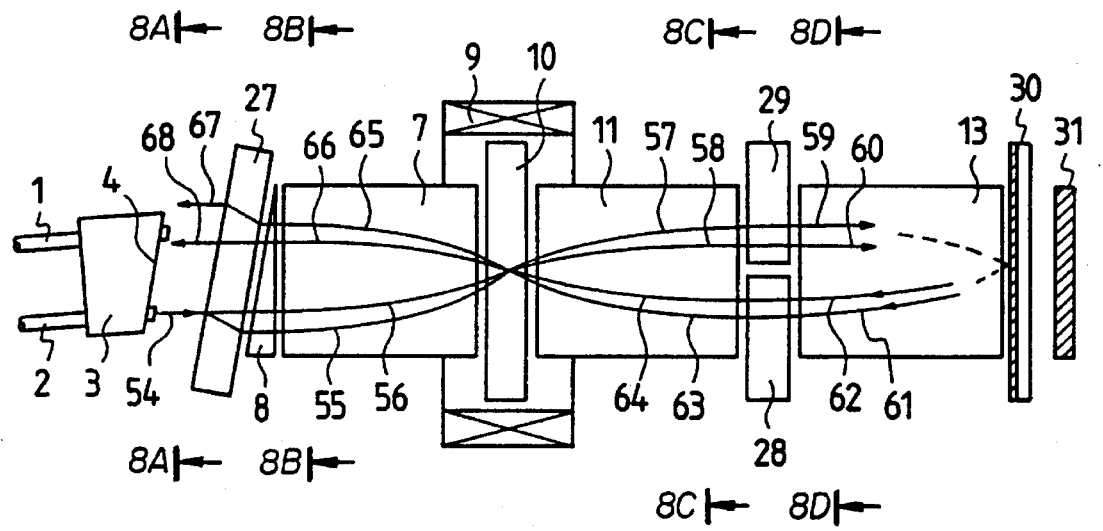
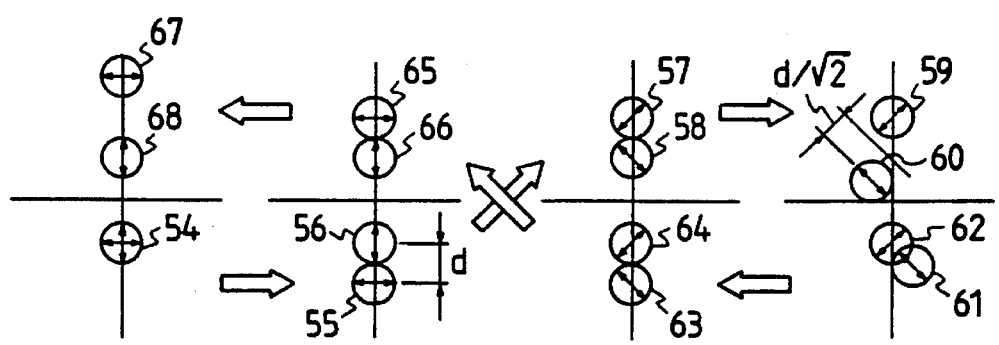
FIG. 8A    FIG. 8B    FIG. 8C    FIG. 8D
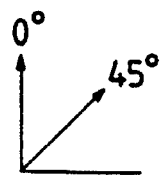
FIG. 8E

OPTICAL ISOLATOR

BACKGROUND OF THE INVENTION

1. Technical Field of the Invention

The present invention relates generally to an optical isolator, and more particularly to a polarization independent optical isolator which may be employed in optical fiber communication systems.

2. Background Art

It is well known in the art that a polarization independent optical isolation operable to block transmission of an optical signal in a reverse direction is an essential device for optical fiber communication systems. Such a polarization independent optical isolator usually utilizes magnetooptic effects which rotate the plane of polarization of incident light irreversibly.

U.S. Pat. No. 4,893,890 to Lutes, issued on Jan. 16, 1990, discloses a conventional optical isolator which includes a first birefringent plate for splitting incident light into two linearly polarized rays whose planes of polarization are oriented in mutually perpendicular directions, a magnetooptic plate for irreversibly rotating the planes of polarization of the linearly polarized rays about 45 deg in a counterclockwise direction, a half wave plate for irreversibly rotating the linearly polarized rays approximately 45 deg, and a second birefringent plate for recombining the two linearly polarized rays on the same optical axis. These elements are arranged in tandem.

In general, the degree of interception of light traveling through an optical isolator in the reverse direction, or the isolation characteristic is dependent upon characteristics of a magnetooptic plate. For example, a single-way isolation optical isolator using a single magnetooptic plate such as that taught by Lutes commonly exhibits the isolation characteristic on the order of 35 dB. This isolation characteristic is insufficient for applications to high-quality optical transmission systems or optical fiber amplifiers. Additionally, the prior art optical isolator is coupled at its both end surfaces to optical fibers through lenses in alignment with the optical fibers. Such an optical isolator encounters a drawback in that a large amount of arrangement space for optical fibers is required for mounting the optical isolator in optical communication systems.

SUMMARY OF THE INVENTION

It is therefore a principal object of the present invention to avoid the disadvantages of the prior art.

It is another object of the present invention to provide a polarization independent optical isolator which is designed to offer improved isolation characteristics and easy installation in optical fiber communication systems.

According to one aspect of the present invention, there is provided an optical isolator which comprises (a) a first polarizing means for splitting a first input optical signal entering in a transmitting direction into first and second polarized optical signals having first and second planes of polarization, respectively, the first plane of polarization being oriented in a first polarization direction, the second plane of polarization being oriented in a second polarization direction perpendicular to the first polarization direction, the second polarized optical signal having the second plane of polarization being shifted from the first polarized optical signal by a first spatial distance in a first angular direction, the first polarization means further splitting a second input optical signal entering in an isolation direction into third and fourth polarized optical signals having the first and second planes of polarization, respectively, the third polarized optical signal having the first plane of polarization being shifted from the fourth polarized optical signal having the second plane of polarization by the first spatial distance in a second angular direction; (b) a first lens designed to converge the first, second, third, and fourth polarized optical signals projected from the first polarizing means; (c) a magnetooptic member functioning to rotate the first and second planes of polarization of the first, second, third, and fourth polarized optical signals projected from the first lens through a predetermined angle to orient the first and second planes of polarization in third and fourth polarization directions to provide third and fourth planes of polarization, respectively; (d) a second lens designed to orient the first, second, third, and fourth polarized optical signals from the magnetooptic member so as to separate the second and third polarized optical signals from the first and fourth polarized optical signals by the first spatial distance; (e) a second polarizing means for shifting the second polarized optical signal having the fourth plane of polarization by a second spatial distance in a third angular direction to align the first and second optical signals on a preselected optical path with a third spatial distance, the second polarizing means also shifting the fourth polarized optical signal having the fourth plane of polarization by the second spatial distance in the third angular direction to shift the third and fourth optical signals out of the preselected optical path; and (f) a reflecting means for reflecting the first, second, third, and fourth polarized optical signals projecting from the second polarizing means back thereinto.

According to another aspect of the present invention, there is provided an optical isolator which comprises (a) a first polarizing means for splitting a first input optical signal, projected from a first optical member, traveling in a first direction substantially extending along an optical axis of the optical isolator into first and second optical signals having first and second planes of polarization, respectively, the first plane of polarization being oriented in a first polarization direction, the second plane of polarization being oriented in a second polarization direction perpendicular to the first polarization direction, the second optical signal having the second plane of polarization being shifted from the first optical signal by a first spatial distance in a first angular direction, when third and fourth optical signals, having the first and second planes of polarization, traveling in a second direction substantially opposite the first direction, pass through the first polarizing means, the first polarizing means shifting the fourth optical signal having the second plane of polarization by the first spatial distance in a second angular direction opposite the first angular direction; (b) a second polarizing means for splitting a second input optical signal, projected from a second optical member, traveling in the first direction into fifth and sixth optical signals having the first and second planes of polarization, respectively, the fifth optical signal having the first plane of polarization being shifted from the sixth optical signal by the first spatial distance in a third angular direction normal to the first and second angular directions, when seventh and eighth optical signal, having the first and second planes of polarization, traveling in the second direction pass through the second polarizing means, the second polarizing means shifting the seventh optical signal having the first plane of polarization by the first spatial distance in a fourth angular direction opposite the third angular direction; (c) a first lens designed to direct the first and second optical signals and the fifth and sixth optical signals, traveling in the first direction, entering from the first polarizing means, in opposite directions to converge the first and second optical signals and the fifth and sixth optical signals; (d) a second lens designed to converge the third and fourth and the seventh and eighth optical signals traveling in the second direction; (e) a magnetooptic member functioning to rotate the first and second planes of polarization of the optical signals through a predetermined angle to provide third and fourth planes of polarization oriented in third and fourth polarization directions, respectively; (f) a third polarizing means for shifting the second and sixth optical signals, each having the fourth plane of polarization oriented by the magnetooptic member, by a second spatial distance in a fifth angular direction, the third polarizing means further shifting the third and seventh optical signals, each having the fourth plane of polarization, by the second spatial distance in a sixth angular direction opposite the fifth angular direction; and (g) a reflecting means for reflecting the first, second, fifth, and sixth optical signals traveling from the first direction toward the second direction.

According to a further aspect of the invention, there is provided an optical isolator which comprises (a) a first polarizing means for splitting a first input optical signal, projected from a first optical member, traveling in a first direction substantially extending along an optical axis of the optical isolator into first and second optical signals having first and second planes of polarization, respectively, the first plane of polarization being oriented in a first polarization direction, the second plane of polarization being oriented in a second polarization direction perpendicular to the first polarization direction, the second optical signal having the second plane of polarization being shifted from the first optical signal by a first spatial distance in a first angular direction, when third and fourth optical signals, having the first and second planes of polarization, traveling in a second direction substantially opposite the first direction, pass through the first polarizing means, the first polarizing means shifting the fourth optical signal having the second plane of polarization by the first spatial distance in a second angular direction opposite the first angular direction, the first polarizing means further splitting a second input optical signal, projected from a second optical member, traveling in the first direction into fifth and sixth optical signals having the first and second planes of polarization, respectively, the sixth optical signal having the second plane of polarization being shifted from the fifth optical signal by the first spatial distance in the first angular direction, when seventh and eighth optical signal, having the first and second planes of polarization, traveling in the second direction pass through the first polarizing means, the first polarizing means shifting the eighth optical signal having the second plane of polarization by the first spatial distance in the second angular direction; (b) a magnetooptic member functioning to rotate the first and second planes of polarization of the optical signals through a predetermined angle to provide third and fourth planes of polarization oriented in third and fourth polarization directions, respectively; (c) a first lens designed to direct the first and second optical signals and the fifth and sixth optical signals, traveling in the first direction, entering from the first polarizing means, in opposite directions to converge the first and second optical signals and the fifth and sixth optical signals onto a given point defined on the magnetooptic member; (d) a second lens designed to converge the third and fourth and the seventh and eighth optical signals traveling in the second direction onto the given point defined on the magnetooptic member; (e) a second polarizing means for shifting the first optical signal, having the third plane of polarization oriented by the magnetooptic member, by a second spatial distance in a third angular direction; (f) a third polarizing means for shifting the fifth optical signals, having the third plane of polarization, by the second spatial distance in a fourth angular direction opposite the third angular direction; and (g) a reflecting means for reflecting the first, second, fifth, and sixth optical signals traveling from the first direction toward the second direction.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings:

FIG. 1 is a cross sectional side view which shows a polarization independent optical isolator according to the present invention.

FIGS. 1A, 1B, 1C and 1D show sectional views of optical fibers showing polarization orientations corresponding to sections A—A, B—B, C—C and D—D of FIG. 1, respectively.

FIG. 1E shows polarization orientations with respect to a coordinate system.

FIG. 2 is a cross sectional side view of a polarization independent optical isolator according to the present invention.

FIGS. 2A, 2B, 2C and 2D show sectional views of optical fibers showing polarization orientations corresponding to sections A—A, B—B, C—C and D—D of FIG. 2, respectively.

FIG. 2E shows polarization orientations with respect to a coordinate system.

FIGS. 7 and 8 are cross-sectional side views which show an alternative embodiment of a polarization independent optical isolator according to the present invention.

DESCRIPTION OF THE PREFERRED EMBODIMENT

Figure 3:
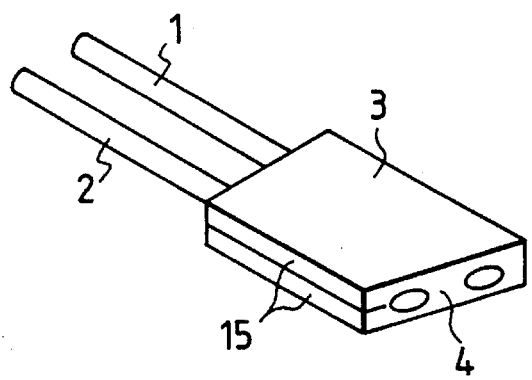
FIG. 3 is a perspective view which shows an optical fiber array for providing an input optical signal to an optical isolator.

Referring now to the drawings, wherein like numbers refer to like parts in several views, particularly to FIGS. 1 and 2, there is shown a polarization independent optical isolator according to the present invention. FIG. 1 shows an optical path along which an input optical signal travels in a forward (transmitting) direction. FIG. 2 shows an optical path along which an input optical signal travels in a reverse (isolation) direction. Additionally, in the drawings, optical signals travel in the horizontal direction. Arrows in circles indicate directions of planes of polarization of the optical signals, as viewed from the left side, on cross-sectional planes A, B, C, and D, shown in FIGS. 1A–1D and in FIGS. 2A–2D, respectively of the optical isolator shown in FIGS. 1 and 2.

The optical isolator includes generally single-mode optical fibers 1 and 2, an optical fiber array 3, a pair of birefringent plates 5 and 6, a converging rod lens 7, a triangle prism 8, a hollow cylindrical magnet 9, a magnetooptic plate 10 (i.e., a Faraday rotator), a converging rod lens 11, a birefringent plate 12, a converging rod lens 13, and a reflecting plate 14.

The optical fiber array 3, as seen in the drawing, retains tip portions of the optical fibers 1 and 2 in parallel to each other, and has a polished surface 4 oriented at an angle of about 8 deg to a plane perpendicular to an optical axis of the optical isolator. The birefringent plates 5 and 6 is formed with such as a rutile plate or a crystal plate, and functions, as well known in the art, to split incident light into a pair of linearly polarized rays whose planes of polarization are oriented in mutually perpendicular directions. The triangle prism 8 is arranged to have its surfaces defining apical angle engage end surfaces of the birefringent plates 5 and 6 and the rod lens 7, respectively to hold the birefringent plates 5 and 6 at a preselected angle with respect to the center line of the optical isolator. The rod lens 7 converges light traveling in the right direction, as viewed in the drawings, onto a specified point defined in the magnetooptic plate 10.

The cylindrical magnet 9 is mounted on the optical isolator detachably in a right direction, as viewed in the drawings. The magnetooptic plate 10 is disposed in the cylindrical magnet 9, and is provided with an yttrium-iron-garnet (YIG) monocrystal or a bimuth-substituted thick garnet film. The magnetooptic plate 10 functions to irreversibly rotate the plane of polarization of incident light about 45 deg ($\pi/4+n\pi/2$, n=0, 1, 2, ...) in a counterclockwise direction, as viewed from the right side in the drawings, under the influence of a magnetic field of the magnet 9. The rod lens 11 converges light traveling in the left direction, as viewed in the drawings, onto the specified point defined in the magnetooptic plate 10. The birefringent plate 12 is arranged adjacent the converging rod lens 11, and is formed with a rutile crystal or a crystal plate for shifting light having a plane of polarization in a preselected direction by a given spatial distance.

The birefringent plates 5, 6, and 12 are so designed as to have directions of optical axes and thicknesses thereof to separate extraordinary rays from incident light in angular directions of −45 deg, 45 deg, and 0 deg, respectively with spatial displacements at a ratio of $\sqrt{2}:\sqrt{2}:1$.

The converging rod lens 13 is disposed between the birefringent plate 12 and the reflecting plate 14, and converges polarized rays from the birefringent plate 12 onto a given point defined on the reflecting plate 14. The reflecting plate 14 is adapted for reflecting the polarized rays from the rod lens 13 back thereinto with substantially no loss.

The converging rod lenses 7, 11, and 13 have numerical apertures greater than those of the optical fibers 1 and 2 so that light emerging from each optical fiber enter each of the converging rod lenses with low insertion loss.

Numerals 40 to 68 denote loci of the central axes of optical signal traveling through the optical isolator.

An operation of the optical isolator when an input optical signal from the optical fiber 1 (i.e., input optical fiber) travels in the forward (transmitting) direction will be discussed hereinbelow with reference to FIG. 1.

The non-polarized light 40 emerging from the optical fiber 1 in a direction substantially extending along the optical axis of the optical isolator first enters the birefringent plate 5 so that it is split into two linearly polarized components: an ordinary ray 41 and an extraordinary ray 42 whose planes of polarization are oriented in mutually perpendicular directions. The extraordinary ray 42 is shifted by a spatial displacement of $\sqrt{2}\times d$ on a plane perpendicular to the optical axis thereof in an angular direction of −45 deg. In this discussion, a direction perpendicular to the drawing is defined as zero (0) deg. In other words, on the cross-sectional planes A, B, C, and D, as shown in FIGS. 1 and 2, the right direction represents 0 deg. Thus, the ordinary ray 41 travels straight through the birefringent plate 5, while the extraordinary ray 42 is shifted from the ordinary ray 41. Note that "d" represents an optional length, but is ideally set to a value at least greater than core diameters of the optical fibers 1 and 2 and smaller than an interval between the optical fibers for preventing light traveling in the reverse direction, as will be discussed in FIG. 2, from entering the optical fiber 2.

After the linearly polarized rays 41 and 42 pass through the triangle prism 8, they enter the converging rod lens 7 from a portion of an end surface thereof slightly shifted from its center line, and then are converged toward the other end surface.

The magnetooptic plate 10 is responsive to a magnetic field of the magnet 9 to irreversibly rotate planes of polarization of the linearly polarized rays 41 and 42 through about 45 deg in a counterclockwise direction. The rays 41 and 42 then enter the converging rod lens 11 as linearly polarized rays 43 and 44 which have experienced in the 45 deg counterclockwise rotation through the magnetooptic plate 10.

The linearly polarized rays 43 and 44 pass through the converging rod lens 11 along optical paths which are reversed vertically and laterally to those in the rod lens 7, and are oriented toward two points apart from each other by a distance $\sqrt{2}\times d$ which are defined near a light-projecting surface of the converging rod lens 11 and diametrically opposed to the light-incident points of the converging rod lens 7 with respect to the center line of the optical isolator.

Subsequently, the converged linearly polarized rays 43 and 44 enter the birefringent plate 12. The birefringent plate 12 is, as shown in the drawing, designed to move the linearly polarized ray 44 a distance d in an angular direction of zero (0) deg so that the ray 44 travels as an extraordinary ray 46, while the ray 43 travels straight as an ordinary ray 45. The linearly polarized rays 45 and 46 are aligned on an optical path extending vertically, as viewed in the drawing, with the distance d.

The linearly polarized rays 45 and 46 then enter the converging rod lens 13, and are converged toward the reflecting plate 14. The reflecting plate 14 reflects the linearly polarized rays 45 and 46 as linearly polarized rays 47 and 48 which are reversed vertically.

The linearly polarized rays 47 and 48 re-enter the converging rod lens 13 so that they are directed onto two points defined on the other surface thereof which are diametrically opposed to the light-incident points, respectively. In other words, the linearly polarized rays 47 and 48 are separated from each other by the same distance as that when the linearly polarized rays 45 and 46 enter the converging rod lens 13 from the birefringent plate 12.

The converged linearly polarized rays 47 and 48 then enter the birefringent plate 12 so that the linearly polarized ray 47 travels straight as an ordinary ray 49, while the linearly polarized ray 48 is propagated as an extraordinary ray 50 along an optical path shifted by the distance d in an angular direction of 180 deg (i.e., in an opposite direction to that when the ray 44 pass through the birefringent plate 12 in the forward direction). The linearly polarized rays 49 and 50 which have passed through the birefringent plate 12 thus travel through the converging rod lens 11 along optical paths which are, as can be seen in FIG. 1, diametrically opposed to those of the rays 43 and 44 with respect to a horizontal plane.

The magnetooptic plate 10, as mentioned previously, rotates the plane of polarization of incident light 45 deg in the counterclockwise direction regardless of a direction of the incident light. Thus, the linearly polarized rays 49 and 50 which have been converged through the converging rod lens 11, are converted into linearly polarized rays 51 and 52 whose planes of polarization are further rotated about 45 deg in the counterclockwise direction as they travel through the magnetooptic plate 10.

The linearly polarized rays 51 and 52 then pass through the converging rod lens 7 along optical paths which are reversed vertically and laterally to those in the rod lens 11, and are directed onto focal points which are defined near the end surface of the optical fibers 1 and 2 and diametrically opposed to the light-incident points of the converging rod lens 11 with respect to the center line of the optical isolator, respectively.

Upon exiting the rod lens 7, the linearly polarized rays 51 and 52 enter the birefringent plate 6 through the triangle prism 8. The plate 6 is, as stated above, designed to have the linearly polarized ray 52 experience a spatial displacement of $-\sqrt{2} \times d$ in an angular direction of 45 deg. Thus, the ordinary ray 51 having traveled straight through the birefringent plate 6 and the extraordinary ray 52 having traveled along a shifted optical path therethrough are recombined into an optical signal 52 identical to the original input optical signal 40. The optical signal 52 is then launched into the optical fiber 2 (i.e., an output optical fiber) of the optical fiber array 3 without loss.

FIG. 2 shows the operation of the optical isolator when an input optical signal is propagated in the reverse (isolation) direction. The operations of the birefringent plates and the converging rod lenses are the same as discussed above and explanation thereof in detail will be omitted here.

As shown, non-polarized light 54 exits the optical fiber 2, and enters the birefringent plate 6 so that they are split into linearly polarized rays 55 and 56 whose planes of polarization are oriented perpendicular to each other. The linearly polarized ray 56 is shifted from the linearly polarized ray 55 the distance $\sqrt{2} \times d$ in the angular direction of 45 deg. The linearly polarized rays 55 and 56 then enter the magnetooptic plate 10 through the triangle prism 8 and the converging rod lens 7.

Upon exiting the magnetooptic plate 10, the linearly polarized rays 55 and 56 enter the converging rod lens 11 as linearly polarized rays 57 and 58 traveling along optical paths which are reversed vertically and laterally to those in the rod lens 7, and then are directed onto the focal points, near the light-projecting surface of the rod lens 11, slightly shifted from the center line thereof.

The linearly polarized rays 57 and 58 are shifted in direction of polarization by approximately 90 deg from the linearly polarized rays 49 and 50 traveling in the forward direction, as shown in FIG. 1. Thus, upon entering the birefringent plate 12, the linearly polarized ray 57 is oriented as an extraordinary ray traveling along an optical path which is shifted by the distance d in the angular direction of 0 deg, while the linearly polarized ray 58 travels straight as an ordinary ray. The rays 57 and 58 are then projected through the converging rod lens 13 onto portions of the reflecting plate 14 which are different from those where the linearly polarized rays 47 and 48, as traveling in the forward direction in FIG. 1, enter the reflecting plate 14. It will be thus appreciated that the linearly polarized rays 59 and 60 reflected by the reflecting plate 14 is not recombined into the original input optical signal to be outputted to the optical fiber 1.

The operation of a single-way isolation optical isolator in the reverse direction, as mentioned above, exhibits isolation characteristics on the order of 35 dB which are insufficient for blocking returning light completely, Therefore, a small amount of linearly polarized rays 61 and 62 may return along the same optical paths as the linearly polarized rays 45 and 46.

The linearly polarized ray 61 passes straight through the birefringent plate 12 as an ordinary ray 63, while the linearly polarized ray 62 is propagated therethrough as an extraordinary ray 64 along an optical path shifted a distance –d in the angular direction of 0 deg. The linearly polarized rays 63 and 64 are then converged as they pass through the converging rod lens 11, and enter the magnetooptic plate 10 so that they are converted into linearly polarized rays 65 and 66 whose planes of polarization are rotated approximately 45 deg in the counterclockwise direction.

As apparent from the drawings, directions of polarization of the linearly polarized rays 65 and 66 are different by about 90 deg from those of the linearly polarized rays 41 and 42 traveling in the forward direction. Accordingly, the linearly polarized ray 65 passes as an ordinary ray 68 through the converging rod lens 7, the triangle prism 8, and the birefringent plate 5, while the linearly polarized ray 65 travels therethrough as an extraordinary ray 67 along an optical path shifted the distance $-\sqrt{2} \times d$ in the angular direction of –45 deg. Therefore, the linearly polarized rays 67 and 68 projected from the birefringent plate 5 are not combined into a single ray, and thus travel along different optical paths from the input optical signal 40 in the forward direction, as shown in FIG. 1, so that they deviate from the optical fiber 1. It will be appreciated that even the small amount of the linearly polarized rays 61 and 62 traveling in the returning direction do not enter the optical fiber 1.

It is desirable that an interval between the optical fibers 1 and 2 be set to a value which is at least greater than an extraordinary ray-separation distance through the birefringent plates 5 and 6 and also greater than core diameters of the optical fibers for preventing the linearly polarized ray 68 from entering the optical fiber 2 adjacent the optical fiber 1.

With the above mentioned operation of the optical isolator, the input optical signal 40 projected from the optical fiber 1 in the forward direction enter the optical fiber 2 without transmission loss, while the input optical signal 54 exiting the optical fiber 2 in the reverse direction are subjected to the isolation twice so that the optical signal 54 is intercepted completely.

Additionally, the optical isolator of the invention is so constructed as to connect with the optical fibers 1 and 2 through one end surface only. This structure makes it easy to arrange the optical fibers around the optical isolator with reduced arrangement space when the optical isolator is mounted on optical communication systems.

Further, the optical fibers are collected to the one side of the optical isolator. This arrangement makes it easy to install and remove the cylindrical magnet 9 on and from the optical isolator through the reflecting plate 14. Thus, by re-installing the magnet 9 on the optical isolator after being coupled to the optical fibers to reverse the polarity of a magnetic field, it becomes possible to intercept light projecting from the optical fiber 1 into the optical isolator.

While in the above embodiment, the birefringent plates 5, 6, and 12 separate extraordinary rays from incident light in angular directions of −45 deg, 45 deg, and 0 deg, respectively. It should be noted however, that the present invention is not limited to the same and that the extraordinary ray-separation directions of the birefringent plates 5, 6, and 12 may be set to 45 deg, −45 deg, and 0 deg in lieu thereof.

Referring to FIG. 3, there is shown the optical fiber array 3 of the optical isolator of the invention.

The optical fiber array 3 includes an optical fiber holder 15 which integrally arrange tip portions of the optical fibers 1 and 2 in parallel. End surfaces of the optical fibers 1 and 2 may be polished together so that the two optical fibers can be coupled to the birefringent plates 5 and 6 at the same time. In addition, the polished end surface 4 of the optical fiber array 3 is inclined at about 8 deg to a plane perpendicular to the optical axis of the optical isolator. This arrangement prevents reflected light on the end surface 4 from being returned back to the optical fibers 1 and 2.

Figure 4:
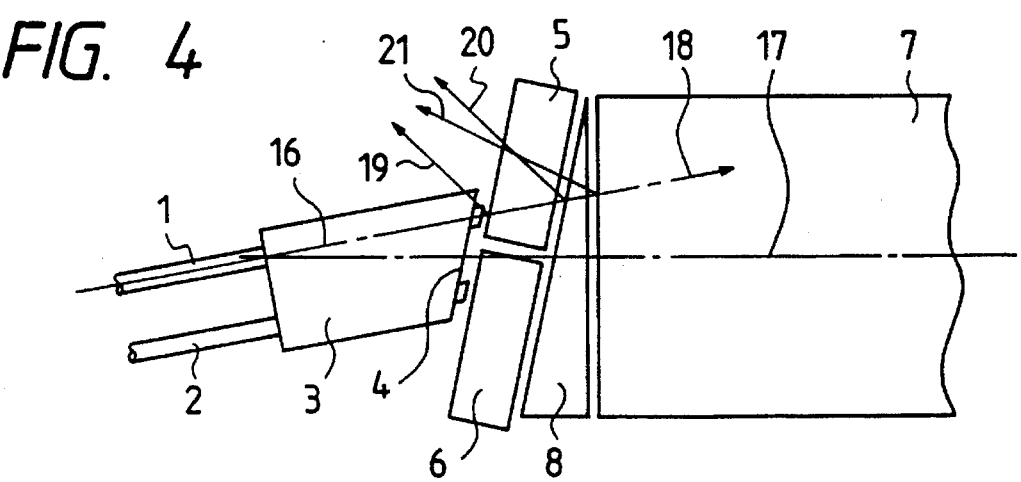
FIG. 4 is a partially cross-sectional view which shows a coupling structure between an optical fiber array and an optical isolator.

FIG. 4 shows a connecting structure between the optical fibers 1 and 2 and the optical isolator which is designed to intercept reflected light on the birefringent plates 5 and 6, the triangle prism 8, or the converging rod lens 7.

The birefringent plates 5 and 6 are, as already mentioned, attached closely to the polished end surface 4 of the optical fiber array 3. An optical axis 16 of the optical fiber array 3 is oriented at a preselected angle (e.g., several degrees) to the center line 17 of the converging rod lens 7. This arrangement prevents reflected light beams 19, 20, and 21, as shown by arrows in the drawing, on end surfaces of the birefringent plates 5 and 6, the triangle prism 8, and the converging rod lens 7 through which incident light 18 passes, from being returned back to the optical fibers 1 and 2.

Additionally, the triangle prism 8 is, as shown in the drawing, interposed between the birefringent plates 5 and 6 and the converging rod lens 7 with its tapered surfaces in contact with the end surfaces of the birefringent plates 5 and 6 and the converging rod lens 7. This arrangement provides stability of installation of the birefringent plates 5 and 6 and index matching of an interval between the birefringent plates 5 and 6 and the converging rod lens 7. Therefore, the optical isolator of the invention assumes great reflection-reduction characteristics.

Figure 5:
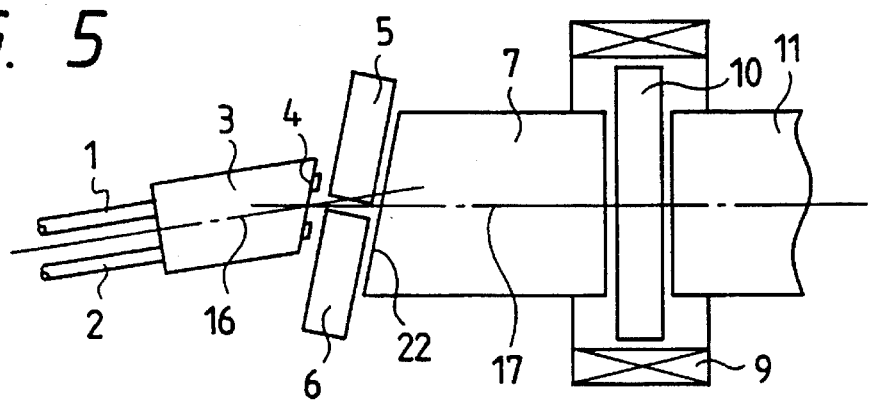
FIG. 5 is a partially cross-sectional view which shows a modification of the coupling structure, as shown in FIG. 4.

Moreover, in place of the triangle prism 8, an inclined end surface 22, as shown in FIG. 5, which is oriented at a preselected angle to the plane perpendicular to the optical axis, may alternatively be formed on the converging rod lens 7 in close engagement with the birefringent plates 5 and 6.

Figure 6A:
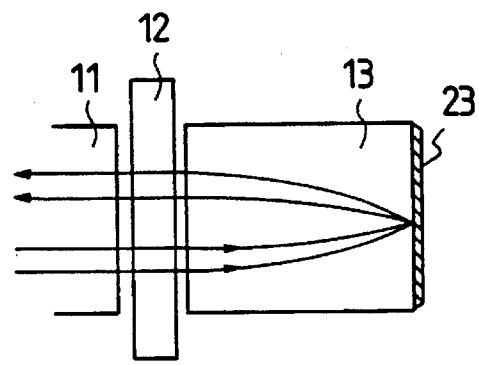
FIGS. 6(*a*) and 6(*b*) are partially side view which show modifications of a reflecting means of an optical isolator.
Figure 6B:
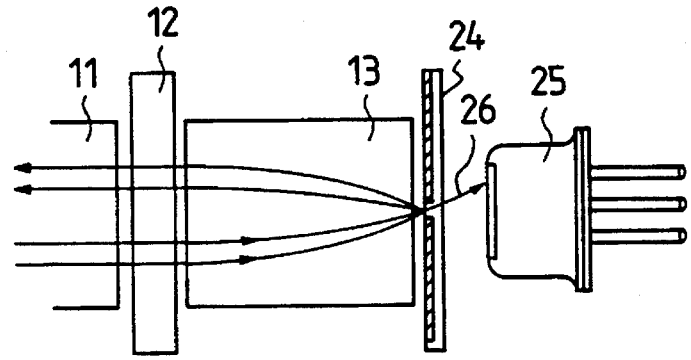

Referring to FIGS. 6(a) and 6(b), there are shown alternative reflecting means of the optical isolator.

While the reflecting means of the above first embodiment, as shown in FIGS. 1 and 2, includes the converging rod lens 13 and the reflecting plate 14, the reflecting means, as shown in FIG. 6(a), includes a dielectric thin film 23 which is deposited directly on an end surface of the converging rod lens 13. This arrangement makes the structure of the reflecting means more simple.

The reflecting means, as shown in FIG. 6(b) includes a half mirror 24 which permits part of incident light to be propagated therethrough. A semiconductor light-sensitive element (photodetector) 25 is provided adjacent the half mirror 24 to monitor the light passing through the half mirror 24.

Referring to FIGS. 7 and 8, there is shown an alternative embodiment of the optical isolator according to the invention. FIG. 7 shows an optical path along which an input optical signal travels in the forward (transmitting) direction, while FIG. 8 shows an optical path along which input optical signal travels in the reverse (isolation) direction. The reference numbers employed in FIGS. 1 and 2 are carried over to FIGS. 7 and 8 for common structural elements, and explanation thereof in detail will be omitted here.

The optical isolator of this embodiment includes a single birefringent plate 27, a pair of birefringent plates 28 and 29, a wavelength filter 30, and a light-absorber 31. The birefringent plate 27 are provided with such as a rutile plate or a crystal plate, and splits incident light into orthogonal linearly polarized rays (i.e., ordinary ray and extraordinary ray). The birefringent plates 28 and 29 are interposed between the converging rod lenses 11 and 13 to receive light projected from the optical fibers 1 and 2, respectively. The birefringent plates 28 and 29 are designed to have an extraordinary ray experience a spatial displacement in the angular direction of 45 deg relative to that of the birefringent plate 27. The amounts of spatial displacements provided by the birefringent plates 27, 28, and 29 are set to d, d/$\sqrt{2}$, and −d/$\sqrt{2}$, respectively.

The wavelength filter 30 is operable to reflect light having a preselected wavelength while allowing light having any other wavelength to pass therethrough. The converging rod lens 13, the wavelength filter 30, and the light-absorber 31 constitutes a reflecting means.

The optical fiber array 3, similar to the above first embodiment, has an inclined polished end surface 4 which is attached closely to the birefringent plate 27. An optical axis of the optical fiber array 3 is oriented at a predetermined angle to the center line of the converging rod lens 7. The birefringent plate 27 is oriented at an angle to the optical axis of the optical isolator to reduce an adverse effect on double refraction properties. Additionally, the optical fibers 1 and 2 are spaced apart from each other by an interval which is greater than the extraordinary ray-separation distance "d" of the birefringent plate 27 and core diameters of the optical fibers for preventing light traveling in the returning direction from entering the adjacent optical fiber.

In operation, non-polarized light 40 emerging from the optical fiber 1 of the optical fiber array 3 enters the birefringent plate 27 so that it is split into two linearly polarized rays 41 and 42 whose planes of polarization are oriented perpendicular to each other. The birefringent plate 27 displaces the linearly polarized ray 42 (i.e., extraordinary ray) the distance −d in an angular direction of 0 deg (i.e., a vertical direction in the drawing). Subsequently, the linearly polarized rays 41 and 42, when passing through the converging rod lens 7 and the magnetooptic plate 10, are converted into linearly polarized rays 43 and 44 which are rotated approximately 45 deg in the counterclockwise direction.

The linearly polarized rays 43 and 44 then enter the birefringent plate 28 after passing through the converging rod lens 11. The birefringent plate 28 shifts the linearly polarized ray 43 as an extraordinary ray by a distance d/$\sqrt{}$+e,fra 2+ee in an angular direction of 45 deg, while the linearly polarized ray 44 travels straight therethrough as an ordinary ray 46.

The linearly polarized rays 45 and 46 pass through the converging rod lens 13, and are reflected by the wavelength filter 30 so that they are returned back into the converging rod lens 13 as linearly polarized rays 47 and 48.

The wavelength filter 30, as mentioned above, reflects light having the preselected wavelength while allowing light having any other wavelength to be transmitted therethrough. Therefore, when the linearly polarized rays 45 and 46 include a component having an unwanted wavelength, it may be removed through the wavelength filter 30 as light 69 which is, in turn, absorbed by the light-absorber 31 completely.

The birefringent plate 29 is, as mentioned above, designed to shift light passing therethrough from the left, as viewed in the drawing, a distance $-d/\sqrt{2}$ in the angular direction of 45 deg. Thus, the linearly polarized ray 48 entering from the right, as viewed in the drawing, travels straight as an ordinary ray 50, while the linearly polarized ray 47 experiences the spatial displacement of $d/\sqrt{2}$ in the angular direction of 45 deg. The linearly polarized rays 49 and 50 are aligned, as shown in the cross-sectional plane C, along an optical axis extending in the angular direction of 0 deg. Subsequently, the linearly polarized rays 49 and 50, as passing through the converging rod lens 11 and the magnetooptic plate 10, are converted into linearly polarized rays 51 and 52 whose planes of polarization are rotated about 45 deg in the counterclockwise direction.

The birefringent plate 27 functions to shift an extraordinary ray entering from the left, as viewed in the drawing, the distance –d in the angular direction of 0 deg. The linearly polarized ray 52 traveling from the right through the converging rod lens 7 is propagated through the birefringent plate 27 as an ordinary ray, while the linearly polarized ray 51 is shifted the distance d in the angular direction of 0 deg to be recombined with the linearly polarized ray 52 to form a single optical signal 53 identical to the original input optical signal 40, which, in turn, enter the optical fiber 2.

Non-polarized light 54 (i.e., an input optical signal), as shown in FIG. 8, exiting the optical fiber 2 in the reverse direction is split into orthogonal linearly polarized rays 55 and 56 as they pass through the birefringent plate 27. After passing through the triangle prism 8 and the converging rod lens 7, the linearly polarized rays 55 and 56, when traversing the magnetooptic plate 10, are converted into linearly polarized rays 57 and 58, respectively whose planes of polarization are rotated about 45 deg in the counterclockwise direction. The linearly polarized rays 57 and 58 then enter the birefringent plate 29 through the converging rod lens 11.

As is clear from the drawings, the directions of polarization of the linearly polarized rays 57 and 58 are shifted about 90 deg from those of the linearly polarized rays 49 and 50, as shown in FIG. 7. Therefore, the linearly polarized ray 57 passes straight through the birefringent plate 29 as an ordinary ray 59. The linearly polarized ray 58, as traversing the birefringent plate 27, experiences a spatial displacement of $-d/\sqrt{2}$ in the angular direction of 45 deg as an extraordinary ray 60. The linearly polarized rays 59 and 60 exit the converging rod lens from different positions from those of the linearly polarized rays 45 and 46, as shown in FIG. 7, traveling through the optical isolator in the forward direction. It will be thus appreciated that the non-polarized light 54 projecting from the optical fiber 2 cannot enter the optical fiber 1.

A small amount of light (i.e., linearly polarized rays 61 and 62) may travel in the returning direction along the same optical paths as those of the linearly polarized rays 45 and 46, as shown in FIG. 7, without being subjected to the isolation.

The linearly polarized ray 62 travels straight through the birefringent plate 29 as an ordinary ray 64. The linearly polarized ray 61, when traversing the birefringent plate 29, is shifted the distance of $-d/\sqrt{2}$ in the angular direction of 45 deg as an extraordinary ray 63. The linearly polarized rays 63 and 64 then enter the magnetooptic plate 9 through the converging rod lens 11 to be converted into linearly polarized rays 65 and 66 whose planes of polarization are rotated about 45 deg in the counterclockwise direction.

The linearly polarized rays 65 and 66 are different in direction of polarization from the linearly polarized rays 41 and 42, as shown in FIG. 7, traveling in the forward direction. Thus, the linearly polarized ray 66 having passed through the converging rod lens 7 travels straight through the birefringent plate 27 as an ordinary ray 68, while the linearly polarized ray 65, as traversing through the birefringent plate 27, is shifted the distance d in the angular direction of 0 deg as an extraordinary ray 67. The linearly polarized rays 67 and 68 are projected from the optical isolator along different optical paths from that of the input optical signal 40, as shown in FIG. 7, traveling in the forward direction without being recombined into the original optical signal. This results in the linearly polarized rays 67 and 68 not being launched into the optical fiber 1.

In the above second embodiment, the spatial displacement direction of the extraordinary ray passing through the birefringent plates 28 and 29 is oriented at 45 deg with respect to that in the birefringent plate 27, however, it may alternatively be oriented at –45 deg. In addition, the spatial displacements of the extraordinary ray passing through the birefringent plates 27, 28, and 29 are set to a ratio of $d:d/\sqrt{2}:-d/\sqrt{2}$, however, they may be set to any suitable value as long as the spatial displacements in the birefringent plates 28 and 29 are the same and oriented at an angle of 180 deg to each other. This arrangement further facilitates design and assembly of the optical isolator as compared with the first embodiment, as shown in FIGS. 1 and 2.

Additionally, in the second embodiment, the triangle prism 8 is used, however, it may alternatively be replaced with the converging rod lens 7, as shown in FIG. 5, which has the inclined end surface 22.

Figure 9:
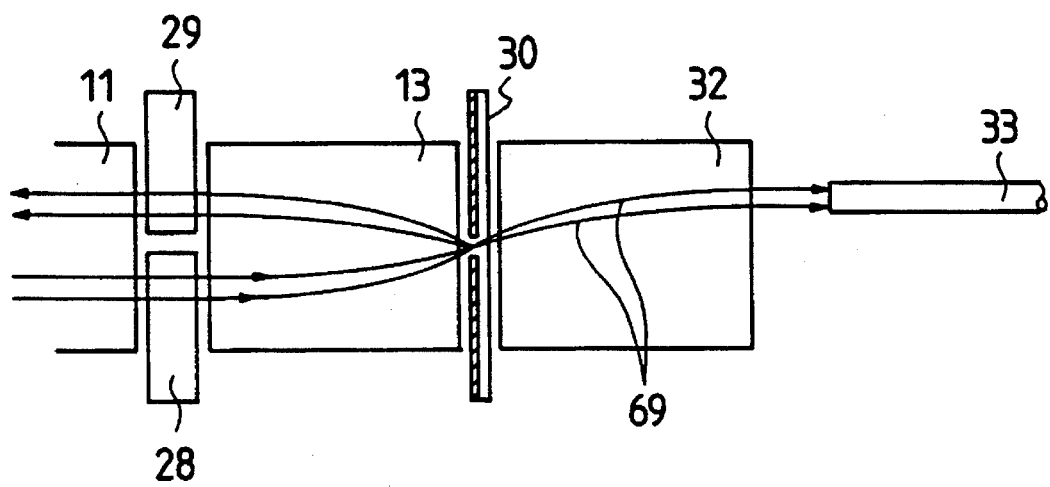
FIG. 9 is a partially cross-sectional view which shows a light-detecting means detecting light passing through a reflecting means of an optical isolator.

Referring to FIG. 9, there is shown a modification of the second embodiment which includes a converging rod lens 32 and an optical fiber 33.

The converging rod lens 32 is arranged in alignment with the wavelength filter 30 for converging the optical signals 69 propagated through the wavelength filter to the optical fiber 33. With this arrangement, an optical signal having an unwanted wavelength passing through the optical isolator may be picked up.

The above mentioned first and second embodiments utilize the converging rod lens. However, a spherical or aspherical lens may alternatively be used instead as long as it has a greater numerical aperture with reduced aberration at a location slightly shifted from the center line thereof. In addition, the birefringent plate may be replaced with such as a polarizing beam splitter having a polarizing film as long as it functions to split incident light into two linear polarized rays and/or to recombine them. Further, interspace between optical devices such as the birefringent plate, the converging rod lens, and the triangle prism may be filled with air or a transparent index matching material. The optical devices may alternatively be connected to each other through antireflection films attached to light-entering surfaces thereof.

As appreciated from the above discussion, the polarization independent optical isolator according to the present invention functions as a dual-way isolation optical isolator which has incident light in the reverse direction experience isolation twice using the reflecting means. Thus, the degree of isolation is greatly improved as compared with a conventional optical isolator.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical isolator comprising:

first polarizing means for splitting a first input optical signal entering in a transmitting direction into first and second polarized optical signals having first and second planes of polarization, respectively, the first plane of polarization being oriented in a first polarization direction, the second plane of polarization being oriented in a second polarization direction perpendicular to the first polarization direction, the second polarized optical signal having the second plane of polarization being shifted from the first polarized optical signal by a first spatial distance in a first angular direction, sad first polarization means further splitting a second input optical signal entering in an isolation direction into third and fourth polarized optical signals having the first and second planes of polarization, respectively, the third polarized optical signal having the first plane of polarization being shifted from the fourth polarized optical signal having the second plane of polarization by the first spatial distance in a second angular direction;

a first lens designed to converge the first, second, third, and fourth polarized optical signals projected from said first polarizing means;

a magnetooptic member functioning to rotate the first and second planes of polarization of the first, second, third, and fourth polarized optical signals projected from said first lens through a predetermined angle to orient the first and second planes of polarization in third and fourth polarization directions to provide third and fourth planes of polarization, respectively;

a second lens designed to orient the first, second, third, and fourth polarized optical signals from said magnetooptic member so as to separate the second and third polarized optical signals from the first and fourth polarized optical signals by the first spatial distance;

a second polarizing means for shifting the second polarized optical signal having the fourth plane of polarization by a second spatial distance in a third angular direction to align the first and second optical signals on a preselected optical path with a third spatial distance, said second polarizing means also shifting the fourth polarized optical signal having the fourth plane of polarization by the second spatial distance in the third angular direction to shift the third and fourth optical signals out of the preselected optical path; and reflecting means for reflecting the first, second, third, and fourth polarized optical signals projecting from said second polarizing means back thereinto.

2. An optical isolator as set forth in claim 1, wherein the first and second input optical signals are input from first and second optical fibers, respectively, said first and second lens including first and second rod lens each having a numerical aperture greater than those of the first and second optical fibers.

3. An optical isolator as set forth in claim 1, further comprising a cylindrical magnet having disposed therein said magnetooptic member.

4. An optical isolator as set forth in claim 3, wherein said cylindrical magnet is detachably provided so as to reverse polarity thereof in assembly.

5. An optical isolator as set forth in claim 1, wherein said reflecting means includes a third lens and a reflecting plate, said third lens being so constructed as to converge the polarized optical signals traveling toward the reflecting plate.

6. An optical isolator as set forth in claim 5, wherein the first and second input optical signals are input from first and second optical fibers, respectively, said third lens having a numerical aperture greater than those of the first and second optical fibers.

7. An optical isolator as set forth in claim 1, wherein said reflecting means includes a third lens and a dielectric film attached to an end surface of said third lens for reflecting the polarized optical signals projecting from said second polarizing means back thereto.

8. An optical isolator as set forth in claim 5, wherein said reflecting plate is provided with a half mirror which allows part of the polarized optical signals to pass therethrough in a preselected direction.

9. An optical isolator as set forth in claim 8, further comprising light-monitoring means for monitoring the polarized optical signals transmitted through said half mirror.

10. An optical isolator as set forth in claim 5, wherein said reflecting plate is provided with a wavelength filter operable to reflect the optical signals having a predetermined wavelength, while allowing the optical signals having any other wavelength to be transmitted therethrough.

11. An optical isolator as set forth in claim 10, further comprising light-detecting means for detecting the optical signals transmitted through said wavelength filter.

12. An optical isolator as set forth in claim 10, further comprising light-absorber absorbing the optical signals transmitted through said wavelength filter for blocking transmission of the optical signals.

13. An optical isolator as set forth in claim 1, further comprising first and second optical fibers providing the first and second input optical signals, respectively, said first polarizing means including first and second birefringent plates independent from each other, the first birefringent plate being arranged between the first optical fiber and said first lens, the second birefringent plate being disposed between the second optical fiber and said first lens, said second polarizing means being provided with a third birefringent plate formed with a single plate member.

14. An optical isolator as set forth in claim 13, wherein the first birefringent plate is adapted to orient an extraordinary ray in the first angular direction with the first spatial distance, the second birefringent plate being adapted to orient an extraordinary ray in the second angular direction normal to the first angular direction with the first spatial distance, the third birefringent plate being adapted to orient an extraordinary ray in the third angular direction oriented at 45 deg to both the first and second angular directions with the second spatial distance, the first spatial distance being the square root of 2 times the second spatial distance, said magnetooptic member rotating the optical signals approximately $\pi/4+n\pi/2$ where $n=0, 1, 2, \ldots$.

15. An optical isolator as set forth in claim 14, wherein the first spatial distance is smaller than an interval between the first and second optical fibers and greater than core diameters of the first and second optical fibers.

16. An optical isolator as set forth in claim 13, further comprising an optical fiber holder retaining tip portions of said first and second optical fibers in parallel to each other to form an optical fiber array, said optical fiber array having a polished surface flush with end surfaces of the tip portions of the first and second optical fibers.

17. An optical isolator as set forth in claim 16, wherein the polished surface of said optical fiber array are inclined at a preselected angle to a plane perpendicular to an optical axis of the optical isolator.

18. An optical isolator as set forth in claim 17, wherein an optical axis of said optical fiber array being oriented at a preselected angle to the center line of said first lens.

19. An optical isolator as set forth in claim 17, wherein said first and second birefringent plates are attached closely to the inclined polished surface of said optical fiber array, said first and second birefringent plates being oriented at a predetermined angle to a plane perpendicular to an optical axis of said first lens.

20. An optical isolator as set forth in claim 19, wherein said first lens is provided with a converging rod lens, a triangle prism being arranged between the first and second birefringent plates and the converging rod lens with light-entering and projecting surfaces closely engaging the first and second birefringent plates and the converging rod lens, respectively for orienting the first and second birefringent plates at the predetermined angle to the plane perpendicular to the optical axis of said first lens.

21. An optical isolator as set forth in claim 19, wherein said first lens includes a converging rod lens having an end surface which is inclined with respect to the plane perpendicular to the optical axis thereof and attached closely to said first and second birefringent plates.

22. An optical isolator as set forth in claim 1, further comprising first and second optical fibers providing the first and second input optical signals, respectively, said first polarizing means including a first birefringent plate formed with a single plate member, said second polarizing means being provided with second and third birefringent plates independent from each other, the second birefringent plate being arranged at a location where the first input optical signal travels, the third birefringent plate being arranged at a location where the second input optical signal travels.

23. An optical isolator as set forth in claim 22, wherein said second birefringent plate is so constructed as to orient an extraordinary ray in the third angular direction with the second spatial distance, the third birefringent plate being so constructed as to orient an extraordinary ray in a fourth angular direction oriented at 180 deg to the third angular direction with the second spatial distance, the fourth angular direction being oriented at 45 deg to the first and second angular directions, said magnetooptic member rotating the optical signals approximately $\pi/4+n\pi/2$ where $n=0, 1, 2, \ldots$.

24. An optical isolator as set forth in claim 23, wherein the first spatial distance of said first birefringent plate is smaller than an interval between the first and second optical fibers and greater than core diameters of the first and second optical fibers.

25. An optical isolator as set forth in claim 22, further comprising an optical fiber holder retaining tip portions of said first and second optical fibers in parallel to each other to form an optical fiber array, said optical fiber array having a polished surface flush with end surfaces of the tip portions of the first and second optical fibers.

26. An optical isolator as set forth in claim 25, wherein the polished surface of said optical fiber array are inclined at a preselected angle to a plane perpendicular to an optical axis of the optical isolator.

27. An optical isolator as set forth in claim 26, wherein an optical axis of said optical fiber array being oriented at a preselected angle to the center line of said first lens.

28. An optical isolator as set forth in claim 26, wherein said first birefringent plate is attached closely to the inclined polished surface of said optical fiber array, said first birefringent plates being oriented at a predetermined angle to a plane perpendicular to an optical axis of said first lens.

29. An optical isolator as set forth in claim 28, wherein said first lens is provided with a converging rod lens, a triangle prism being arranged between the first birefringent plate and the converging rod lens with light-entering and projecting surfaces closely engaging the first birefringent plate and the converging rod lens, respectively for orienting the first birefringent plate at the predetermined angle to the plane perpendicular to the optical axis of said first lens.

30. An optical isolator as set forth in claim 28, wherein said first lens includes a converging rod lens having an end surface which is inclined with respect to the plane perpendicular to the optical axis thereof.

31. An optical isolator comprising:

first polarizing means for splitting a first input optical signal, projected from a first optical member, traveling in a first direction substantially extending along an optical axis of the optical isolator into first and second optical signals having first and second planes of polarization, respectively, the first plane of polarization being oriented in a first polarization direction, the second plane of polarization being oriented in a second polarization direction perpendicular to the first polarization direction, the second optical signal having the second plane of polarization being shifted from the first optical signal by a first spatial distance in a first angular direction, when third and fourth optical signals, having the first and second planes of polarization, traveling in a second direction substantially opposite the first direction, pass through said first polarizing means, said first polarizing means shifting the fourth optical signal having the second plane of polarization by the first spatial distance in a second angular direction opposite the first angular direction;

second polarizing means for splitting a second input optical signal, projected from a second optical member, traveling in the first direction into fifth and sixth optical signals having the first and second planes of polarization, respectively, the fifth optical signal having the first plane of polarization being shifted from the sixth optical signal by the first spatial distance in a third angular direction normal to the first and second angular directions, when seventh and eighth optical signal, having the first and second planes of polarization, traveling in the second direction pass through said second polarizing means, said second polarizing means shifting the seventh optical signal having the first plane of polarization by the first spatial distance in a fourth angular direction opposite the third angular direction;

a first lens designed to direct the first and second optical signals and the fifth and sixth optical signals, traveling in the first direction, entering from said first polarizing means and said second polarizing means to converge the first and second optical signals and the fifth and sixth optical signals;

a second lens designed to converge the third and fourth and the seventh and eighth optical signals traveling in the second direction;

a magnetooptic member functioning to rotate the first and second planes of polarization of the optical signals through a predetermined angle to provide third and fourth planes of polarization oriented in third and fourth polarization directions, respectively;

a third polarizing means for shifting the second and sixth optical signals, each having the fourth plane of polarization oriented by said magnetooptic member, by a second spatial distance in a fifth angular direction, said third polarizing means further shifting the third and seventh optical signals, each having the fourth plane of polarization, by the second spatial distance in a sixth angular direction opposite the fifth angular direction; and reflecting means for reflecting the first, second, fifth, and sixth optical signals traveling from the first direction toward the second direction.

32. An optical isolator comprising:

first polarizing means for splitting a first input optical signal, projected from a first optical member, traveling in a first direction substantially extending along an optical axis of the optical isolator into first and second optical signals having first and second planes of polarization, respectively, the first plane of polarization being oriented in a first polarization direction, the second plane of polarization being oriented in a second polarization direction perpendicular to the first polarization direction, the second optical signal having the second plane of polarization being shifted from the first optical signal by a first spatial distance in a first angular direction, when third and fourth optical signals, having the first and second planes of polarization, traveling in a second direction substantially opposite the first direction, pass through said first polarizing means, said first polarizing means shifting the fourth optical signal having the second plane of polarization by the first spatial distance in a second angular direction opposite the first angular direction, said first polarizing means further splitting a second input optical signal, projected from a second optical member, traveling in the first direction into fifth and sixth optical signals having the first and second planes of polarization, respectively, the sixth optical signal having the second plane of polarization being shifted from the fifth optical signal by the first spatial distance in the first angular direction, when seventh and eighth optical signal, having the first and second planes of polarization, traveling in the second direction pass through said first polarizing means, said first polarizing means shifting the eighth optical signal having the second plane of polarization by the first spatial distance in the second angular direction;

a magnetooptic member functioning to rotate the first and second planes of polarization of the optical signals through a predetermined angle to provide third and fourth planes of polarization oriented in third and fourth polarization directions, respectively;

a first lens designed to direct the first and second optical signals and the fifth and sixth optical signals, traveling in the first direction, entering from said first polarizing means and said second polarizing means to converge the first and second optical signals and the fifth and sixth optical signals onto a given point defined on said magnetooptic member;

a second lens designed to converge the third and fourth and the seventh and eighth optical signals traveling in the second direction onto the given point defined on said magnetooptic member;

a second polarizing means for shifting the first optical signal, having the third plane of polarization oriented by said magnetooptic member, by a second spatial distance in a third angular direction;

a third polarizing means for shifting the fifth optical signals, having the third plane of polarization, by the second spatial distance in a fourth angular direction opposite the third angular direction; and reflecting means for reflecting the first, second, fifth, and sixth optical signals traveling from the first direction toward the second direction.

* * * * *